United States Patent
Zhao et al.

(10) Patent No.: US 12,554,008 B2
(45) Date of Patent: Feb. 17, 2026

(54) THREE-DIMENSIONAL IMAGING METHOD AND APPARATUS AND THREE-DIMENSIONAL IMAGING DEVICE

(71) Applicants: Nuctech Company Limited, Beijing (CN); Tsinghua University, Beijing (CN)

(72) Inventors: Ziran Zhao, Beijing (CN); Xing Liu, Beijing (CN); Lingbo Qiao, Beijing (CN); Zhimin Zheng, Beijing (CN); Yingkang Jin, Beijing (CN); Yan You, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 230 days.

(21) Appl. No.: 18/266,140

(22) PCT Filed: Nov. 25, 2021

(86) PCT No.: PCT/CN2021/133078
§ 371 (c)(1),
(2) Date: Jun. 8, 2023

(87) PCT Pub. No.: WO2022/121695
PCT Pub. Date: Jun. 16, 2022

(65) Prior Publication Data
US 2024/0054698 A1 Feb. 15, 2024

(30) Foreign Application Priority Data
Dec. 9, 2020 (CN) .......................... 202011429712.7

(51) Int. Cl.
*G01S 13/88* (2006.01)
*G06N 3/0464* (2023.01)
(Continued)

(52) U.S. Cl.
CPC .......... *G01S 13/887* (2013.01); *G06N 3/0464* (2023.01); *G06N 3/084* (2013.01);
(Continued)

(58) Field of Classification Search
CPC ..... G06T 11/003; G06T 7/11; G06T 2200/04; G06T 2207/10028; G06T 2207/20084;
(Continued)

(56) References Cited

U.S. PATENT DOCUMENTS 5,455,590 A   10/1995 Collins et al.
11,132,780 B2 *  9/2021 Xie .......................... G01S 17/06
(Continued)

FOREIGN PATENT DOCUMENTS

CN   104375141 A   2/2015
CN   105510912 A   4/2016
(Continued)

OTHER PUBLICATIONS

Chen, L., Zhu, Y., Papandreou, G., Schroff, F., and Adam, H. (Aug. 2018). Encoder-decoder with Atrous separable convolution for semantic image segmentation. ArXiv. (Year: 2018).*
(Continued)

*Primary Examiner* — Vladimir Magloire
*Assistant Examiner* — Anna K. Gosling
(74) *Attorney, Agent, or Firm* — K&L Gates LLP

(57) ABSTRACT

The present application relates to a three-dimensional imaging method and apparatus, and a 3D imaging device. The method comprises generating 3D image information by capturing a 3D capture area containing a detected object using a depth camera; extracting a mask of the detected object from the 3D image information; determining an imaging area associated with the detected object based on the mask of the detected object; collecting data from a holographic data collection area containing the detected (Continued)

object by a holographic data collection device, generating holographic data; and performing image reconstruction on the imaging area based on the holographic data.

16 Claims, 6 Drawing Sheets

(51) Int. Cl.
*G06N 3/084* (2023.01)
*G06T 7/11* (2017.01)
*G06T 11/00* (2006.01)

(52) U.S. Cl.
CPC .............. *G06T 7/11* (2017.01); *G06T 11/003* (2013.01); *G06T 2200/04* (2013.01); *G06T 2207/10028* (2013.01); *G06T 2207/20084* (2013.01)

(58) Field of Classification Search
CPC ....... G01S 13/887; G01S 13/89; G01V 8/005; G01V 3/12; G06N 3/084
See application file for complete search history.

(56) References Cited

U.S. PATENT DOCUMENTS

| | | | |
|---|---|---|---|
| 11,194,038 B2* | 12/2021 | Moulder | ............... G01S 13/887 |
| 2015/0048964 A1 | 2/2015 | Chen et al. | |
| 2015/0293221 A1 | 10/2015 | Ahmed | |
| 2017/0337713 A1 | 11/2017 | Hoelzer et al. | |
| 2019/0196004 A1 | 6/2019 | Zhao et al. | |
| 2019/0279051 A1 | 9/2019 | Martinello et al. | |
| 2019/0294108 A1 | 9/2019 | Ozcan et al. | |
| 2020/0319591 A1 | 10/2020 | Shanks et al. | |
| 2021/0174103 A1* | 6/2021 | Schumacher | ........... G06F 18/22 |
| 2021/0325528 A1 | 10/2021 | Chen et al. | |
| 2022/0036563 A1* | 2/2022 | Beltrand | ................. G06N 3/08 |

FOREIGN PATENT DOCUMENTS

| | | | |
|---|---|---|---|
| CN | 108333905 A | 7/2018 | |
| CN | 109118490 A | 1/2019 | |
| CN | 109358372 A * | 2/2019 | ............. G01V 8/005 |
| CN | 109375220 A | 2/2019 | |
| CN | 109471197 A | 3/2019 | |
| CN | 109816011 A | 5/2019 | |
| CN | 209433032 A | 9/2019 | |
| CN | 110363843 A | 10/2019 | |
| CN | 110910506 A | 3/2020 | |
| CN | 110930374 A | 3/2020 | |
| CN | 111414860 A | 7/2020 | |
| CN | 111553310 A | 8/2020 | |
| CN | 111652884 A * | 9/2020 | ............. G06V 10/40 |
| CN | 111754528 A | 10/2020 | |
| IN | 111896951 A | 11/2020 | |
| JP | 2015036678 A | 2/2015 | |
| KR | 102145220 B1 | 8/2020 | |
| WO | 2012115042 A1 | 8/2012 | |
| WO | WO2015021790 A1 | 2/2015 | |
| WO | 2020134334 A1 | 7/2020 | |

OTHER PUBLICATIONS

Niu, Y., Liu, X., Qiao, L. (Sep. 2020). Research on fast back-propagation algorithm for millimeter-wave holographic imaging. Chinese Journal of Lasers. 17(9). (Year: 2020).*
CNIPA; First Office Action for Chinese Patent Application No. 202011429712.7 dated Oct. 24, 2024, 18 pages.
Hu, Xin, et al., "A Millimeter 3-Dimensional Holographic Imaging Algorithm of Target's Local Region", Guidance & Fuze, vol. 37, No. 1, Mar. 2016, 6 pages.
International Search Report dated Feb. 25, 2022 issued for International PCT Application No. PCT/CN2021/133078.
Niu, Yijie et al., Fast Backpropagation Algorithm for Milimeter-Wave Holographic Imaging, Chinese Journal of Laser, vol. 47, No. 09, May 26, 2020, pp. 1-6.
CNIPA; Second Office Action for Chinese Patent Application No. 202011429712.7 dated Feb. 28, 2025, 18 pages.
JPO; Notice for Reasons of Refusal for Japanese Patent Application No. 2023-534681 dated Jan. 12, 2024, 5 pages.
CNIPA; Notice of Registration and Notice of the Granting of a Patent Right for an Invention for Chinese Patent Application No. 202011429712.7 dated Dec. 9, 2025, 8 pages.

* cited by examiner

THREE-DIMENSIONAL IMAGING METHOD AND APPARATUS AND THREE-DIMENSIONAL IMAGING DEVICE

CROSS-REFERENCE TO RELATED APPLICATIONS

The present disclosure is a National Stage of International Application No. PCT/CN2021/133078 filed on Nov. 25, 2021, which claims priority to Chinese Patent Application No. 202011429712.7, filed on Dec. 9, 2020, entitled "THREE-DIMENSIONAL IMAGING METHOD AND APPARATUS AND THREE-DIMENSIONAL IMAGING DEVICE", both of which are hereby incorporated by reference in their entireties.

FIELD OF THE INVENTION

The present disclosure relates to the field of security inspection, in particular to a three-dimensional (3D) imaging method and apparatus utilizing millimeter waves, and a 3D imaging device.

BACKGROUND OF THE INVENTION

At present, the anti-terrorism situation at home and abroad is becoming increasingly serious. Terrorists may carry dangerous goods such as knives, guns, explosives and so on through concealed means, which seriously threatens people's life and safety. Thus, there is an urgent need for human body security inspections in specific places such as airports and stations.

Millimeter waves refer to electromagnetic waves with a frequency between 30 GHz and 300 GHz. Because millimeter waves may penetrate clothes and have no ionizing radiation, they are especially suitable for human body safety inspections.

In recent years, millimeter-wave 3D holographic imaging technology has been more and more widely used in the field of human body security inspection, which greatly reduces workload of security personnel. It can be applied to customs, airports, courts and large-scale security activities and it is a kind of safe, civilized and efficient new security inspection mode.

It is known that there is an active millimeter wave human body security imaging technology. This method uses broadband millimeter wave to irradiate the human body, realizes direct measurement of holographic data through heterodyne mixing technology, and then reconstructs complex reflectivity images.

SUMMARY OF THE INVENTION

In the previous image reconstruction process using 3D imaging method of active multiple-input multiple-output (MIMO) millimeter wave, an imaging area, which is the object of image reconstruction, usually defaults to a rectangular frame containing human body, for example, scanning range of antenna array. In this rectangular frame, in addition to a human body mask (including the human body and clothing), there are also other pixel points that are useless for ultimately determining whether the human body is carrying dangerous articles or not. Therefore, in this case, image reconstruction speed is slow, and each pixel reconstruction requires all holographic data, resulting in a huge amount of computation. Thus, each image reconstruction will waste a lot of time and computational resources.

The present application provides a 3D imaging system, method capable of reducing imaging area and reducing calculation amount and a control device thereof.

According to a first aspect of the present application, a 3D imaging method is provided. The method comprises: a 3D information obtaining step, for generating 3D image information by capturing a 3D capture area containing a detected object using a depth camera; a mask extracting step, for extracting a mask of the detected object from the 3D image information; an imaging area determining step, for determining an imaging area associated with the detected object based on the mask of the detected object; a holographic data obtaining step, for collecting data on a holographic data collection area containing the detected object by a holographic data collection device, to generate holographic data; and an image reconstructing step, for performing image reconstruction on the imaging area based on the holographic data.

In the first aspect described above, the mask extracting step further comprises applying an image segmentation algorithm to the 3D image information to extract the mask of the detected object.

In the first aspect described above, the image segmentation algorithm is a DeepLabV3+ segmentation algorithm based on a neural network.

In the first aspect described above, a backpropagation imaging algorithm is applied in the image reconstructing step for the image reconstruction.

In the first aspect described above, the holographic data collection device comprises a multiple-input multiple-output (MIMO) antenna array, and the MIMO antenna array comprises a plurality of pairs of transmitting and receiving antennas for transmitting and receiving millimeter waves. The backpropagation imaging algorithm comprises: calculating, for a pixel point in the imaging area, a sum of distances from the pixel point to each pair of the transmitting and receiving antennas; obtaining a complex reflectance of each pixel point in the imaging area by performing an operation of summing for all of the transmitting and receiving antennas, as well as transmission frequencies of the millimeter waves, based on the holographic data received by the receiving antenna and the sum of distances; and creating a reconstructed image based on the complex reflectance calculated for all of the pixel points in the imaging area.

In the first aspect described above, the backpropagation imaging algorithm includes: calculating, by using formula (1), a sum of distances $r_{T,R}$ from a pixel point (x, y, z) in the imaging area to each pair of the transmitting and receiving antennas;

$$r_{T,R} = \sqrt{(x-x_T)^2+(y-y_T)^2+z^2} + \sqrt{(x-x_R)^2+(y-y_R)^2+z^2} \quad (1)$$

obtaining, by using formula (2), a complex reflectance $\hat{O}(x, y, z)$ of the pixel (x, y, z) in the imaging area, based on the holographic data $s(x_T, y_T, x_R, y_R, k)$ received by the receiving antenna and the sum of distances $r_{T,R}$:

$$\hat{O}(x, y, z) = \sum_{\forall y_r}\sum_{\forall x_r}\sum_{\forall y_t}\sum_{\forall x_t}\sum_{\forall k} s(x_T, y_T, x_R, y_R, k)\exp(jkr_{T,R}) \quad (2)$$

wherein $(x_R, y_R, 0)$ are coordinates of the receiving antenna, $(x_T, y_T, 0)$ are coordinates of the transmitting antenna, (x, y, z) are coordinates of the pixel points in the imaging area, k is wave number, and $k=2\pi/\lambda$, wherein $\lambda$ is wavelength; and creating a reconstructed image based on the complex reflectance calculated for all of the pixel points in the imaging area.

In the first aspect described above, the holographic data collection device comprises a multiple-input multiple-output (MIMO) antenna array, and the MIMO antenna array comprises a plurality of pairs of transmitting and receiving antennas for transmitting and receiving millimeter waves. The backpropagation imaging algorithm is a fast backpropagation imaging algorithm comprising: calculating, for each pair of the transmitting and receiving antennas, a contribution value of the pair of the transmitting and receiving antennas to each pixel point in the imaging area; obtaining, for all of the transmitting and receiving antennas, a complex reflectance of each pixel point in the imaging area by performing an operation of summing for all of the transmitting and receiving antennas, based on the contribution value; and creating a reconstructed image based on the complex reflectance.

In the first aspect described above, calculating, for each pair of the transmitting and receiving antennas, the contribution value of the pair of the transmitting and receiving antennas to each pixel point in the imaging area comprises: calculating, for the pair of the transmitting and receiving antennas, a sum of distances from each pixel point in the imaging area to the pair of the transmitting and receiving antennas; and calculating the contribution value based on the sum of distances and the holographic data received by the receiving antenna.

In the first aspect described above, the fast backpropagation imaging algorithm comprises: calculating, by using formula (3), for each pair of a transmitting antenna T and a receiving antenna R, a sum $r_{T,R}$ of distances from a pixel point (x, y, z) in the imaging area to the pair of the transmitting and receiving antennas:

$$r_{T,R} = \sqrt{(x-x_T)^2 + (y-y_T)^2 + z^2} + \sqrt{(x-x_R)^2 + (y-y_R)^2 + z^2} \quad (3)$$

calculating, by using formula (4), a contribution value $P_{T,R}$ to the pixel point (x, y, z), based on the sum $r_{T,R}$ of distances and the holographic data $s(x_T, y_T, x_R, y_R, k)$ received by the receiving antenna:

$$P_{T,R} = \Sigma_{\forall k} s(x_T, y_T, x_R, y_R, k) \exp(jkr_{T,R}) \quad (4)$$

obtaining, by using formula (5), a complex reflectance $\hat{O}(x, y, z)$ of each pixel point in the imaging area, based on the contribution value $P_{T,R}$:

$$\hat{O}(x,y,z) = \Sigma_{\forall y_r} \Sigma_{\forall x_r} \Sigma_{\forall y_T} \Sigma_{\forall x_T} P_{T,R} \quad (5)$$

wherein, $r_{T,R}$ is the sum of distances from the pixel point (x, y, z) in the imaging area to each pair of the transmitting and receiving antennas, $s(x_T, y_T, x_R, y_R, k)$ is the holographic data obtained through the pair of the transmitting and receiving antennas, k is wave number, and $k=2\pi/\lambda$, wherein $\lambda$ is wavelength; and creating a reconstructed image based on the complex reflectance.

In the first aspect described above, calculating, for each pair of the transmitting and receiving antennas, the contribution value of the pair of the transmitting and receiving antennas to each pixel point in the imaging area comprises: classifying the pixel points in the imaging area that have the same sum of distances to the pair of the transmitting and receiving antennas into a group; and calculating the contribution value of the pair of transmitting and receiving antennas to any one of the pixel points in the group, as the contribution value of each pixel point in the group.

In the first aspect described above, calculating, for each pair of the transmitting and receiving antennas, the contribution value of the pair of the transmitting and receiving antennas to each pixel point in the imaging area comprises: calculating a minimum and maximum value of the sum of distances from all of the pixel points in the imaging area to the pair of transmitting and receiving antennas; dividing a distance between the minimum and maximum value into equal intervals, to obtain N equipartition values ($r_1$, $r_2$, ..., $r_N$) for the sums of distances; calculating the sum of distances from any one of the pixel points in the imaging area to the pair of transmitting and receiving antennas, and determining an equipartition value nearest to the sum of distances as the sum of distances for the pixel point; determining nearest equipartition values for all of the pixel points in the imaging area; and calculating contribution values by taking the N equipartition values as the sums of distances respectively.

In the first aspect described above, the method further comprises: a key point determining step, for determining a core key point of the detected object based on a deep learning model; and an imaging area adjusting step, for selecting a portion of the detected object associated with the core key point in the imaging area based on the core key point, so as to adjust the imaging area.

In the first aspect described above, the method further comprises: a key point determining step, for determining a core key point of the detected object based on a deep learning model, and a detected object posture determining step, for determining whether a posture of the detected object is correct based on a position of the core key point, and triggering an alarm under a condition that the posture is not correct.

According to a second aspect of the present application, a 3D imaging system is provided, characterized in that it comprises a depth camera, a holographic data collection device, and a control device. The control device comprises: a 3D information obtaining module, for controlling the depth camera to capture a 3D capture area containing a detected object to obtain 3D image information; a mask extracting module, for extracting a mask of the detected object from the 3D image information; an imaging area determining module, for determining an imaging area associated with the detected object based on the mask of the detected object; a holographic data obtaining module, for controlling the holographic data collection device to collect data from a holographic data collection area containing the detected object to generate holographic data; and an image reconstructing module, for performing image reconstruction on the imaging area based on the holographic data.

In the second aspect described above, the holographic data collection device comprises a multiple-input multiple-output (MIMO) antenna array, and the MIMO antenna array comprises a plurality of pairs of transmitting and receiving antennas for transmitting and receiving millimeter waves.

According to a third aspect of the present application, a 3D imaging apparatus is provided. The apparatus comprises: a 3D information obtaining module, for obtaining 3D image information by capturing a 3D capture area containing a detected object using a depth camera; a mask extracting module, for extracting a mask of the detected object from the 3D image information; an imaging area determining module, for determining an imaging area associated with the detected object based on the mask of the detected object; a holographic data obtaining module, for obtaining holographic data collected from a holographic data collection area containing the detected object by a holographic data collection device; and an image reconstructing module, for performing image reconstruction on the imaging area based on the holographic data.

According to a fourth aspect of the present application, a computer readable medium comprising computer programs, which when executed by a processor, cause the following steps: a 3D information obtaining step, for obtaining 3D image information by capturing a 3D capture area containing a detected object using a depth camera; a mask extracting step, for extracting a mask of the detected object from the 3D image information; an imaging area determining step, for determining an imaging area associated with the detected object based on the mask of the detected object; a holographic data obtaining step, for obtaining holographic data collected from a holographic data collection area containing the detected object by a holographic data collection device; and an image reconstructing step, for performing image reconstruction on the imaging area based on the holographic data.

According to a fifth aspect of the present application, a 3D imaging device is provided. The 3D imaging device comprises a memory, a processor, and program instructions stored in the memory and executable by the processor, wherein the processor, when executing the program instructions, implement: a 3D information obtaining step, for obtaining 3D image information by capturing a 3D capture area containing a detected object using a depth camera; a mask extracting step, for extracting a mask of the detected object from the 3D image information; an imaging area determining step, for determining an imaging area associated with the detected object based on the mask of the detected object; a holographic data obtaining step, for obtaining holographic data collected from a holographic data collection area containing the detected object by a holographic data collection device; and an image reconstructing step, for performing image reconstruction on the imaging area based on the holographic data.

In the present application, the 3D image information is obtained through the depth camera, the image segmentation algorithm is applied to the 3D image information, the human body mask is extracted, and the imaging area is determined according to the human body mask, so that the 3D human body mask conforming to the human body contour can be determined, which may reduce the computational load of image reconstruction. In addition, the image reconstruction speed may be improved by performing image reconstruction on the imaging area utilizing the fast backpropagation imaging algorithm.

Figure 1:
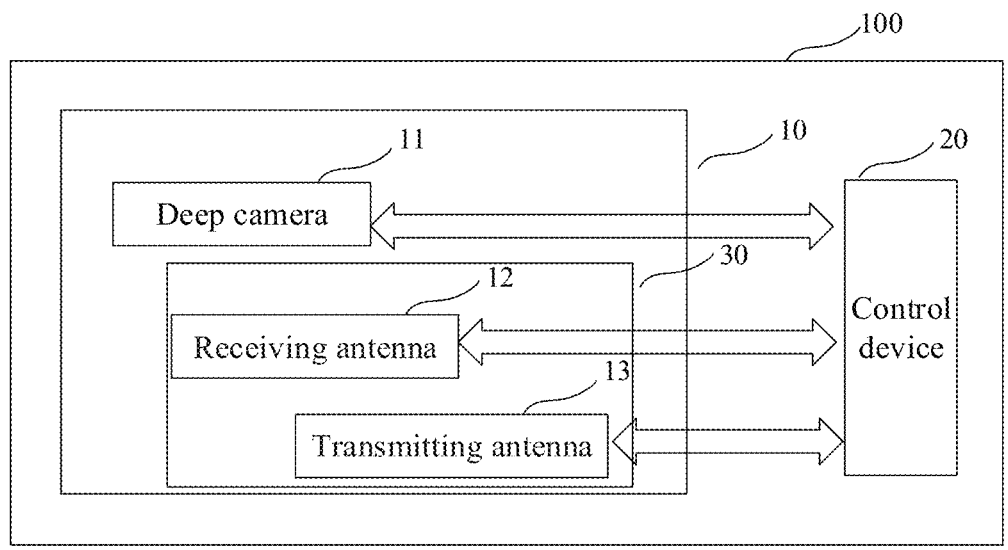
FIG. 1 is a block diagram schematically illustrating a 3D imaging system according to a first implementation of the present application.

SYMBOL DESCRIPTION 10, 10', 10": millimeter wave imaging device;
20: control device;
30: holographic data collection device;
11, 11', 11": depth camera;
12, 12', 12": receiving antenna;
13, 13', 13": transmitting antenna.

DETAILED DESCRIPTION

Hereinafter, the 3D imaging system and method according to the embodiments of the present application will be specifically described with reference to the drawings. In the following description, the same or similar reference numerals refer to the same or similar component.

First Implementation

FIG. 1 illustrates a 3D imaging system 100 according to a first implementation of the present application. As shown in FIG. 1, the 3D imaging system 100 includes: a millimeter wave imaging device 10 and a control device 20. The millimeter wave imaging device 10 includes a depth camera 11 and a holographic data collection device 30.

The millimeter wave imaging device 10 is configured for imaging by irradiating millimeter wave to a holographic data collection area including a detected object and receiving the reflected millimeter wave. Here, the millimeter wave imaging device 10 uses active millimeter wave scanning. The detected objects include people, animals, goods, etc. as security inspection objects. The holographic data collection area is an area capable of collecting holographic data, for example, an area covered by an antenna array for transmitting and receiving millimeter waves.

The millimeter wave imaging device 10 is configured for imaging with penetrating ability of millimeter waves for ordinary clothing. After passing through the clothing, the millimeter waves irradiated to the human body is reflected upon coming into contact with objects such as the surface of human body or other hidden objects. The holographic data may be obtained by receiving the reflected millimeter waves, and image reconstruction based on the holographic data may determine whether dangerous objects such as weapons are hidden on the surface of human body. The holographic data is a complex signal containing amplitude and phase information.

The depth camera 11 is a camera capable of detecting a depth of field distance of an imaging space, that is, depth information. In other words, the depth camera 11 may also be referred to as a 3D camera. The depth camera 11 may obtain a distance from a certain point in a 3D capture area including the detected object to the depth camera 11, so as to obtain 3D information of the capture area. The depth camera 11 may be an existing depth camera. Generally, there are depth cameras with the following three principles: structured light (Structured-light), binocular vision (Stereo), and optical time-of-flight (TOF).

The holographic data collection device 30 is configured for collecting the holographic data. The holographic data collection device 30 includes a receiving antenna 12 and a transmitting antenna 13. Specifically, the holographic data collection device 30 includes a multiple-input multiple-output (MIMO) antenna array which may include a plurality of pairs of a transmitting antenna 13 and a receiving antenna 12 for transmitting and receiving millimeter waves.

Here, the numbers of the transmitting antennas 13 and the receiving antennas 12 are not necessarily the same. As long as the receiving antenna 12 may receive the millimeter waves emitted from the transmitting antenna 13, a pair of the transmitting antenna 13 and the receiving antenna 12 for transmitting and receiving millimeter waves may be formed. Multiple-input multiple-output refers to a combination of a plurality of pairs of the transmitting antenna 13 and the receiving antenna 12. For example, if there are two transmitting antennas 13 and three receiving antennas 12, and all of the three receiving antennas 12 may receive millimeter waves transmitted by the two transmitting antennas 13, then there are six pairs of transmit antennas 13 and receive antennas 12, so as to realize multiple-input multiple-output.

The transmitting antenna 13 is configured for transmitting millimeter waves, and the receiving antenna 12 is configured for receiving the reflected millimeter waves. The receiving antenna 12 and the transmitting antenna 13 are arranged as a multiple-input multiple-output array for the millimeter waves. The receiving antenna 12 and the transmitting antenna 13 may use active millimeter waves to scan the holographic data collection area, so as to obtain the holographic data.

The 3D capture area of the depth camera 11 and the holographic data collection area of the holographic data collection device 30 may be different, as long as both of them contain the detected object.

Specifically, for example, the millimeter wave imaging device 10 may be an electronic scanning type (see FIG. 2) or a mechanical scanning type (see FIG. 3) of a multiple-input multiple-output millimeter wave imaging device.

Figure 2:
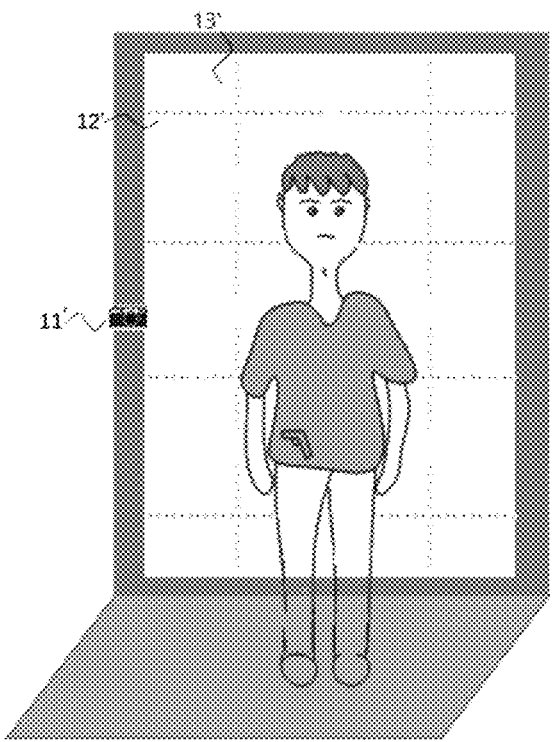
FIG. 2 is a schematic diagram illustrating an electronical scanning millimeter wave imaging device.

FIG. 2 is a schematic diagram illustrating an electronic scanning type of millimeter wave imaging device 10'. In FIG. 2, the receiving antennas 12' and the transmitting antennas 13' are arranged into a compact box shaped MIMO array. The MIMO array includes several sub-block arrays, and each sub-block array includes two sets of transceiver arrays arranged orthogonally. In other words, two pairs of the transmitting and receiving antennas are arranged orthogonally. The electronic scanning type of millimeter wave imaging device 10' is configured for collecting the holographic data by using a fast switch to switch the receiving antenna 12' and the transmitting antenna 13'. Specifically, the switching may be performed as follows: any one of the transmitting antennas 13' in the transceiver array may sequentially transmit at each transmitting frequency point f1, f2, . . . fn in a millimeter wave band, and all of the receiving antennas are configured for receiving. Then, throughout the transmitting antennas, that is, all of the transmitting antennas are configured for performing the above operations. In addition, the depth camera 11' is arranged outside the MIMO array, for obtaining depth data.

Figure 3:
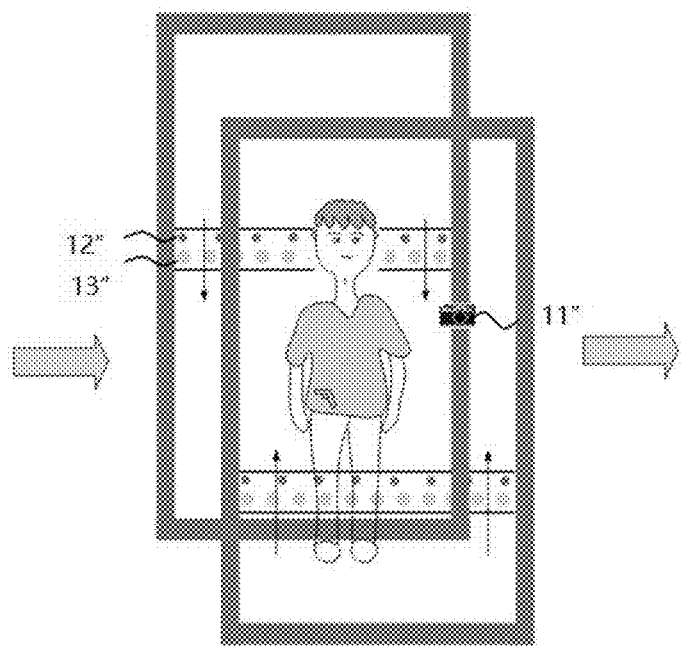
FIG. 3 is a schematic diagram illustrating a mechanical scanning millimeter wave imaging device.

FIG. 3 is a schematic diagram illustrating a mechanical scanning type of millimeter wave imaging device 10". The millimeter wave imaging device 10" is a one-dimensional mechanical scanning imaging device with the MIMO. As shown in FIG. 3, the receiving antennas 12" and the transmitting antennas 13" are respectively arranged in a one-dimensional linear array. Specifically, in the mechanical scanning type of millimeter wave imaging device 10", the above-mentioned one-dimensional linear array may move in a vertical direction. For example, a motor or the like may be set to make the above-mentioned one-dimensional linear array move from top to bottom. In the process of moving from top to bottom, any one of the transmitting antennas 13' may sequentially transmit at each transmitting frequency point f1, f2, . . . fn in a millimeter wave band, and all of the receiving antennas are configured for receiving. However, throughout the transmitting antennas, the above-mentioned process is repeatedly executed during the movement by the motor or the like until the movement is completed.

The depth camera 11" is arranged outside the one-dimensional linear array with the MIMO and is configured for obtaining depth data. The location of the depth camera is not particularly limited, as long as it may not interfere with the transmitting and receiving antennas and obtain the depth information. Although a depth camera 11" in FIG. 3 is configured at a position different from that of the depth camera 11' in FIG. 2, they may also be configured at the same position.

Hereinafter, regardless of the way to scan, the millimeter wave imaging devices 10', 10" are collectively referred to as the millimeter wave imaging device 10, the depth cameras 11', 11" are collectively referred to as the depth camera 11, and the receiving antennas 12', 12" are collectively referred to as the receiving antenna 12, and the transmitting antennas 13', 13" are collectively referred to as the transmitting antenna 13.

In the prior art, the most commonly used method is one-dimensional single-input single-output or quasi single-input single-output linear array mechanical scanning, which however has problems such as low imaging quality and high noise impact.

As mentioned above, in the embodiments of the present application, no matter the electronic scanning method or the mechanical scanning method, the MIMO array arrangement is adopted. Through the MIMO array arrangement, it is possible to obtain beneficial effects such as high signal-to-noise ratio and fewer dead corners in reconstructed images.

The control device 20 is configured to control the millimeter wave imaging device 10. Specifically, the control device 20 is connected to the depth camera 11 and the holographic data collection device 30 included in the millimeter wave imaging device 10, and is configured to control the depth camera 11 to obtain 3D image information, and control the receiving antenna 12 and the transmitting antenna 13 of the holographic data collection device 30 to obtain the holographic data by millimeter wave scanning.

Specifically, the control device 20 functionally includes the following functional modules: a 3D information obtaining module, for obtaining 3D image information captured by capturing a 3D capture area containing a detected object using a depth camera; a mask extracting module, for extracting a mask of the detected object from the 3D image information; an imaging area determining module, for determining an imaging area associated with the detected object based on the mask of the detected object; a holographic data obtaining module, for obtaining holographic data collected from a holographic data collection area containing the detected object by a holographic data collection device; and an image reconstructing module, for performing image reconstruction on the imaging area based on the holographic data.

The control device 20 may be implemented by software, or by hardware, or by a coordinated combination of software and hardware.

The control device 20 may have a processor and a memory.

The processor may include a CPU (Central Processing Unit), a GPU (Graphics Processing Unit), and the like. The processor may include a plurality of processors, or include a multi-core processor, and share part of the processing performed by the control device 20, thereby reducing the processing load of a single processor or a single processing unit. Wherein, multiple processors or multi-core processors may respectively execute the above-mentioned part of the processing in parallel, so as to improve operation speed.

The memory includes, for example, a ROM (Read Only Memory) in which programs and various data are stored, and a RAM (Random Access Memory) used as a work area of the CPU.

The control device 20 may be configured for controlling by the processor executing programs stored in the memory.

The control device 20 may also include FPGA (Field Programmable Gate Array), ASIC (Application Specific Integrated Circuit) and other hardware. Part or all of the processing performed by the control device 20 may be realized by FPGA, ASIC, or the like.

Hereinafter, the 3D imaging method performed by the control device 20 will be described in detail with reference to FIG. 4.

In step S11, the depth camera 11 is controlled to obtain 3D image information. Since the depth camera 11 may obtain distance (depth) information from a certain point in the imaging area to the depth camera 11, the 3D image information of an object in the imaging area may be obtained.

In the present application, the 3D image information may be obtained by using the depth camera to obtain the depth data. In addition, by determining the imaging area based on the 3D image information, a 3D spatial area may be used as the imaging area, thereby improving the quality of the reconstructed image.

In step S12, an image segmentation algorithm is applied to the 3D image information obtained by the depth camera 11 to extract a human body mask. The human body mask represents an outer contour of the human body as a security inspection object, including the human body and clothes.

Here, the image segmentation algorithm is a machine learning based image segmentation algorithm. Specifically, a neural network may be used.

In the image segmentation algorithm based on machine learning, a certain amount of security inspection scene data is collected, and the human body mask is marked for the 3D image information as training data. The 3D image information obtained by the depth camera 11 is used as an input, and a neural network is configured to perform image segmentation to obtain a learned human body mask.

By applying the image segmentation algorithm based on the neural network, the human body mask that is relatively close to the actual human body outline may be effectively identified from the 3D image information.

Specifically, the image segmentation algorithm may use a DeepLabV3+ segmentation algorithm. The neural network built based on the DeepLabV3+ segmentation algorithm includes an encoder and a decoder.

The DeepLabV3+ segmentation algorithm may specifically include:
- the front end of the encoding layer uses hollow convolution to obtain shallow low-level features and transmits them to the front end of the decoder;
- the backend of the encoding layer uses vgg-16 (Visual Geometry Group Network) to obtain deep advanced feature information and transmit it to the decoder;
- the decoder connects the features to the network layer, and then refines them through a 3×3 feature convolution;
- at the back end of the decoder, after bilinear 4 times sampling, the human body mask by deep learning is obtained.

By adopting the DeepLabV3+ segmentation algorithm, image segmentation with higher accuracy may be achieved, and the segmentation effect of the human mask may be improved.

In step S13, the imaging area is determined based on the human body mask. The imaging area refers to an object area to be image reconstructed (imaging).

Specifically, a binary segmentation map may be used, and the points within the human body mask are set to "1", and the points outside are set to "0". Here, "1" represents the point that needs to be reconstructed, and "0" represents the point that does not need to be reconstructed.

As described above, in the present implementation, the imaging area is determined based on the human body mask representing the outer contour of the human body.

However, in the previous millimeter wave imaging devices, the imaging area for image reconstruction is usually defaulted to be a rectangular frame containing a human body in image reconstruction techniques. However, there is no need to reconstruct the pixel points within the rectangular frame and outside the human body mask, which wastes computing resources, and the image reconstruction process is slow.

In contrast, in the present application, by using the image segmentation algorithm based on artificial intelligence, the human body mask in the 3D image is identified, and the imaging area is determined based on the human body mask, thereby avoiding image reconstruction of redundant object areas and saving computing resources to improve the speed of computing image reconstruction.

In step S14, the array of transmitting and receiving antennas with the MIMO is configured to scan with active millimeter waves to obtain the holographic data.

Wherein, for the specific manner of obtaining holographic data by scanning with active millimeter waves, reference may be made to the electronic scanning method illustrated in FIG. 2 and the mechanical scanning method illustrated in FIG. 3.

Figure 4:
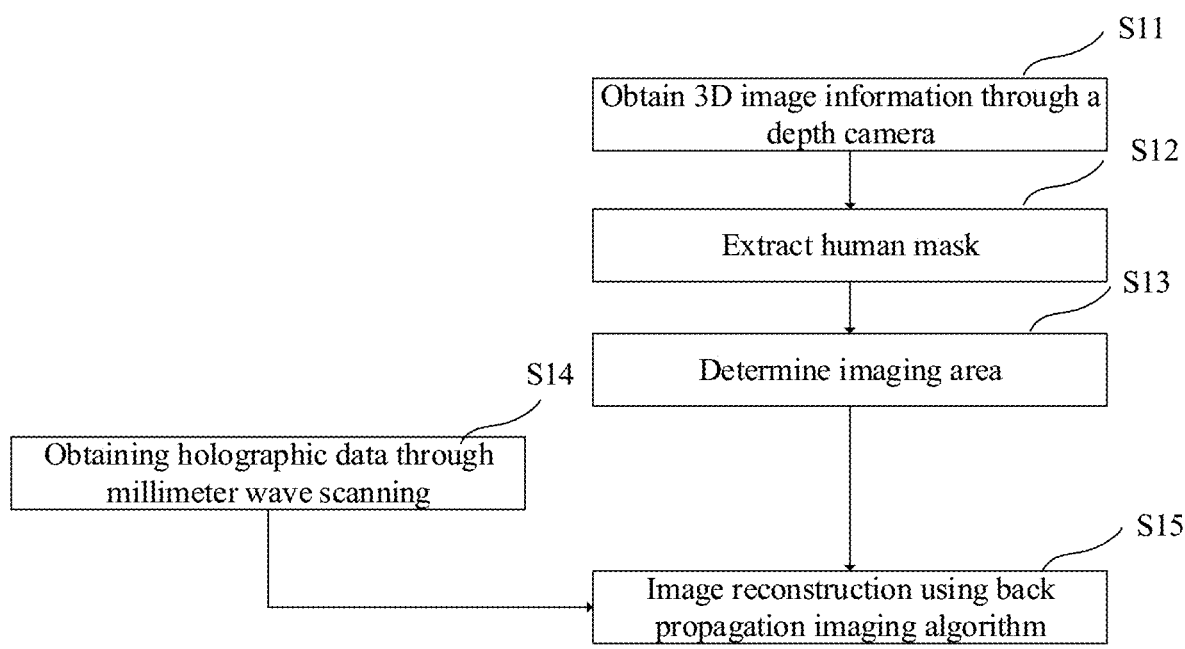
FIG. 4 is a flowchart illustrating a 3D imaging method according to the first implementation of the present application.

In FIG. 4, it is shown that the above-mentioned step S13 and step S14 are parallel, that is, the determination of the imaging area and the acquisition of holographic data are performed in parallel. However, step S13 and step S14 may also be performed sequentially.

In step S15, based on the holographic data obtained in step S14, image reconstruction is performed on the imaging area determined in step S13 using a backpropagation imaging algorithm.

Hereinafter, the backpropagation imaging algorithm will be specifically described.

Embodiment 1

When performing image reconstruction on the imaging area determined in step S13, the backpropagation imaging algorithm may include the following steps:

Firstly, for each pair of the transmitting antenna 13 and the receiving antenna 12, a sum of distances from the pixel points of the imaging area to the pair of the transmitting antenna 13 and the receiving antenna 12 is calculated.

Then, based on the sum of distances and the holographic data obtained in step S14, a complex reflectance of the pixel point is obtained by performing an operation of summing for all of the transmitting antennas 13 and receiving antennas 12 as well as all transmitting frequencies in the millimeter wave band. Finally, a reconstructed image is created based on the complex reflectance calculated for all of the pixel points in the imaging area. Summing for all of the transmitting antennas 13 and receiving antennas 12 as well as all transmitting frequencies in the millimeter wave band may be: throughout all of the transmitting antennas 13 and receiving antennas 12, summing according to the horizontal and vertical coordinates for all of the transmitting antennas 13 and receiving antennas 12, and summing for each frequency point of all transmit frequencies in the millimeter wave band.

Specifically, the backpropagation imaging algorithm may include:

calculating, by using formula (1), a sum of distances $r_{T,R}$ from a pixel point (x, y, z) in the imaging area to each pair of the transmitting and receiving antennas;

$$r_{T,R}=\sqrt{(x-x_T)^2+(y-y_T)^2+z^2}+\sqrt{(x-x_R)^2+(y-y_R)^2+z^2} \quad (1)$$

obtaining, by using formula (2), a complex reflectance $\hat{O}(x, y, z)$ of the pixel (x, y, z) in the imaging area, based on the holographic data $s(x_T, y_T, x_R, y_R, k)$ received by the receiving antenna and the sum of distances $r_{T,R}$:

$$\hat{O}(x, y, z) = \sum_{\forall y_r}\sum_{\forall x_r}\sum_{\forall y_t}\sum_{\forall x_t}\sum_{\forall k} s(x_T, y_T, x_R, y_R, k)\exp(jkr_{T,R}) \quad (2)$$

wherein $(x_R, y_R, 0)$ are coordinates of the receiving antenna 12, $(x_T, y_T, 0)$ are coordinates of the transmitting antenna 13, (x, y, z) are coordinates of the pixel points in the imaging area, k is wave number, and $k=2\pi/\lambda$, wherein $\lambda$ is wavelength; and In this formula (2), a phase compensation $\exp(jkr_{T,R})$ is applied to the holographic data $s(x_T, y_T, x_R, y_R, k)$, and all of the receiving antennas and transmitting antennas and all transmitting frequencies in the millimeter wave band are traversed, that is, summing for 5 times according to the horizontal and vertical coordinates for all of the transmitting antennas 13 and receiving antennas 12 and the wave number.

For all of the pixel points in the imaging area, repeating the above steps, that is, throughout all of the pixel points, calculating a complex reflectance, and creating a reconstructed image based on the complex reflectance.

In the prior art, there is no corresponding image reconstruction algorithm of MIMO. Even if the scanning method of MIMO is adopted, the reconstruction algorithm of SISO is still used, which cannot reflect the MIMO array. The reconstructed image has the advantages of high signal-to-noise ratio and less dead angle.

As mentioned above, in the embodiments of the present application, a MIMO reconstruction algorithm that matches the scanning method of the MIMO array is provided, so that the reconstructed image of the MIMO array has high signal-to-noise ratio, less dead angle and other advantages.

Embodiment 2

The backpropagation imaging algorithm in the embodiment 2 is a fast backpropagation imaging algorithm.

The fast backpropagation imaging algorithm may include the following steps:

calculating, for each pair of the transmitting and receiving antennas, a sum of distances from each pixel point in the imaging area to the pair of the transmitting and receiving antennas;

calculating the contribution value based on the sum of distances and the holographic data received by the receiving antenna;

obtaining, for all of the transmitting and receiving antennas, a complex reflectance of each pixel point in the imaging area by performing an operation of summing for all of the transmitting and receiving antennas, based on the contribution value. Summing for all of the transmitting and receiving antennas may specifically be performing the summing according to the horizontal and vertical coordinates of all of the transmitting and receiving antennas respectively.

Figure 5:
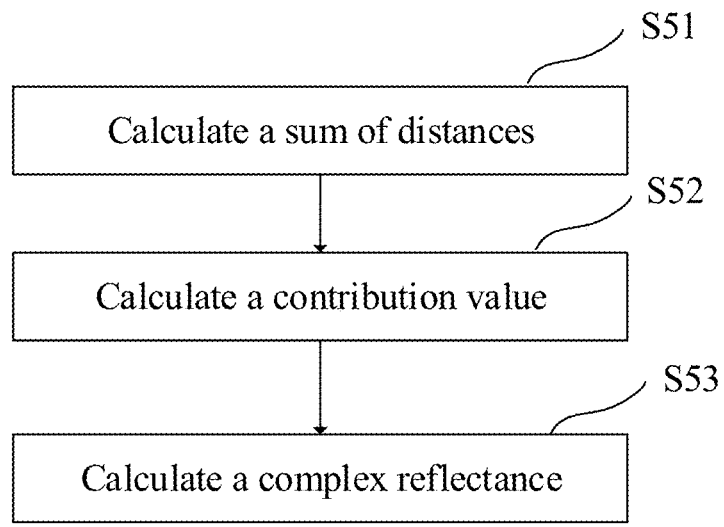
FIG. 5 is a flowchart illustrating one example of a fast backpropagation algorithm.

Specifically, as shown in FIG. 5, the fast backpropagation imaging algorithm may include:

in step S51, calculating, by using formula (3), for each pair of a transmitting antenna T and a receiving antenna R, a sum $r_{T,R}$ of distances from a pixel point (x, y, z) in the imaging area to the pair of the transmitting and receiving antennas;

$$r_{T,R}=\sqrt{(x-x_T)^2+(y-y_T)^2+z^2}+\sqrt{(x-x_R)^2+(y-y_R)^2+z^2} \quad (3)$$

in step S52, calculating, by using formula (4), a contribution value $P_{T,R}$ to the pixel point (x, y, z), based on the sum $r_{T,R}$ of distances and the holographic data $s(x_T, y_T, x_R, y_R, k)$ received by the receiving antenna;

$$P_{T,R}=\Sigma_{\forall k}s(x_T,y_T,x_R,y_R,k)\exp(jkr_{T,R}) \quad (4)$$

in particular, a phase compensation value $\exp(jkr_{T,R})$ is calculated based on the sum $r_{T,R}$ of distances and the wave number k, and the phase compensation value $\exp(jkr_{T,R})$ is applied to the holographic data $s(x_T, y_T, x_R, y_R, k)$ to obtain the contribution value $P_{T,R}$.

in step S53, obtaining, by using formula (5), a complex reflectance $\hat{O}(x, y, z)$ of each pixel point in the imaging area, based on the contribution value $P_{T,R}$:

$$\hat{O}(x,y,z)=\Sigma_{\forall y_r}\Sigma_{\forall x_r}\Sigma_{\forall y_t}\Sigma_{\forall x_t}P_{T,R} \quad (5)$$

wherein, $r_{T,R}$ is the sum of distances from the transmitting and receiving antennas to the pixel point (x, y, z) in the imaging area, $s(x_T, y_T, x_R, y_R, k)$ is the holographic data obtained through the pair of the transmitting and receiving antennas, k is wave number, and $k=2\pi/\lambda$, wherein $\lambda$ is wavelength; k is a parameter representing the emission frequency of millimeter waves, and j is an imaginary symbol.

Figure 6:
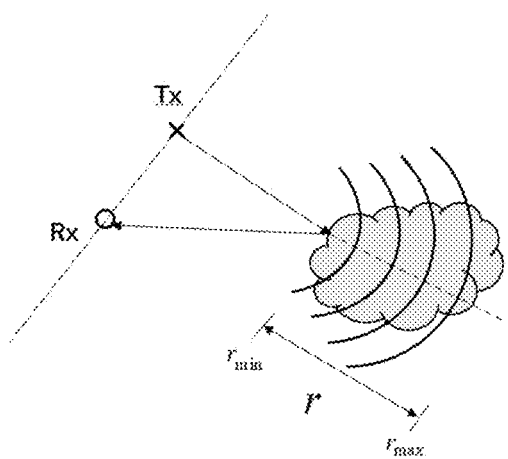
FIG. 6 is a schematic diagram illustrating the fast backpropagation algorithm.

The contribution value of the holographic data to different pixel points created by a pair of transmitting and receiving antennas is related to the sum of distances $r_{T,R}$. As shown in FIG. 6, when the sum of distances $r_{T,R}$ are the same, these pixel points are distributed on an ellipsoid, and two focal points of the ellipsoid are the transmitting antenna $(x_T, y_T, 0)$ and the receiving antenna $(x_R, y_R, 0)$. If $r_{T,R}$ is changed, then the major axis of the ellipsoid will be changed accordingly.

When performing image reconstruction through the above-mentioned fast backpropagation imaging algorithm, the contribution values $P_{T,R}$ of the pixel points located on the same ellipsoid are the same.

Therefore, based on this principle, the pixel points of the imaging area may be divided according to the ellipsoid. In other words, the pixel points with the same sum of distances $r_{T,R}$ in the imaging area, that is, the pixel points located on the same ellipsoid, are divided as a group. For a group of pixel points, the contribution value $P_{T,R}$ is only calculated once, and the complex reflectance of the group of pixel points is calculated based on the contribution value, so as to achieve image reconstruction.

Figure 7:
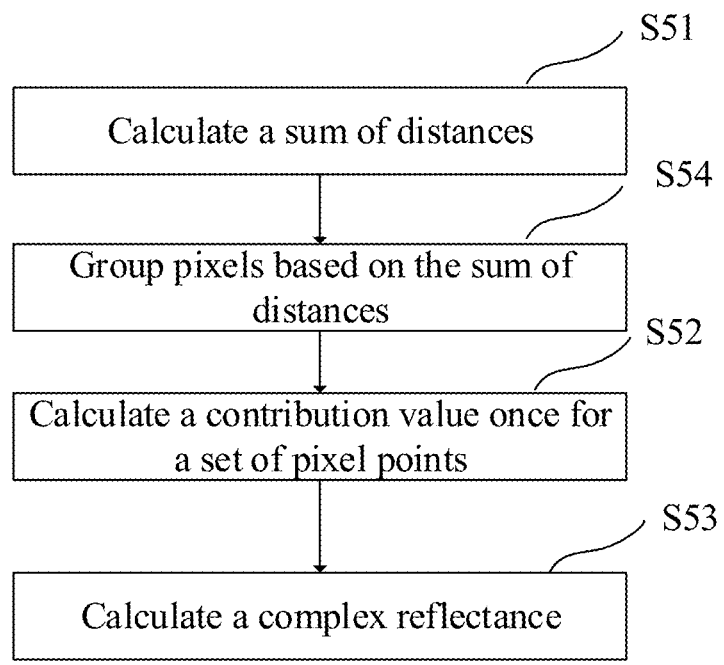
FIG. 7 is a flowchart illustrating one example of the fast backpropagation algorithm.

In other words, as shown in FIG. 7, before step S52 in FIG. 5, step S54 may also be included. In step S54, all of the pixels in the imaging area are grouped according to the sum of distances $r_{T,R}$ calculated by formula (3). And in step S52, the operation of formula (4) is only performed once for the same group of pixels. In other words, the contribution value of any one of the pixel points in the group of pixel points is calculated and used as the contribution value of each pixel point in the group.

Figure 8:
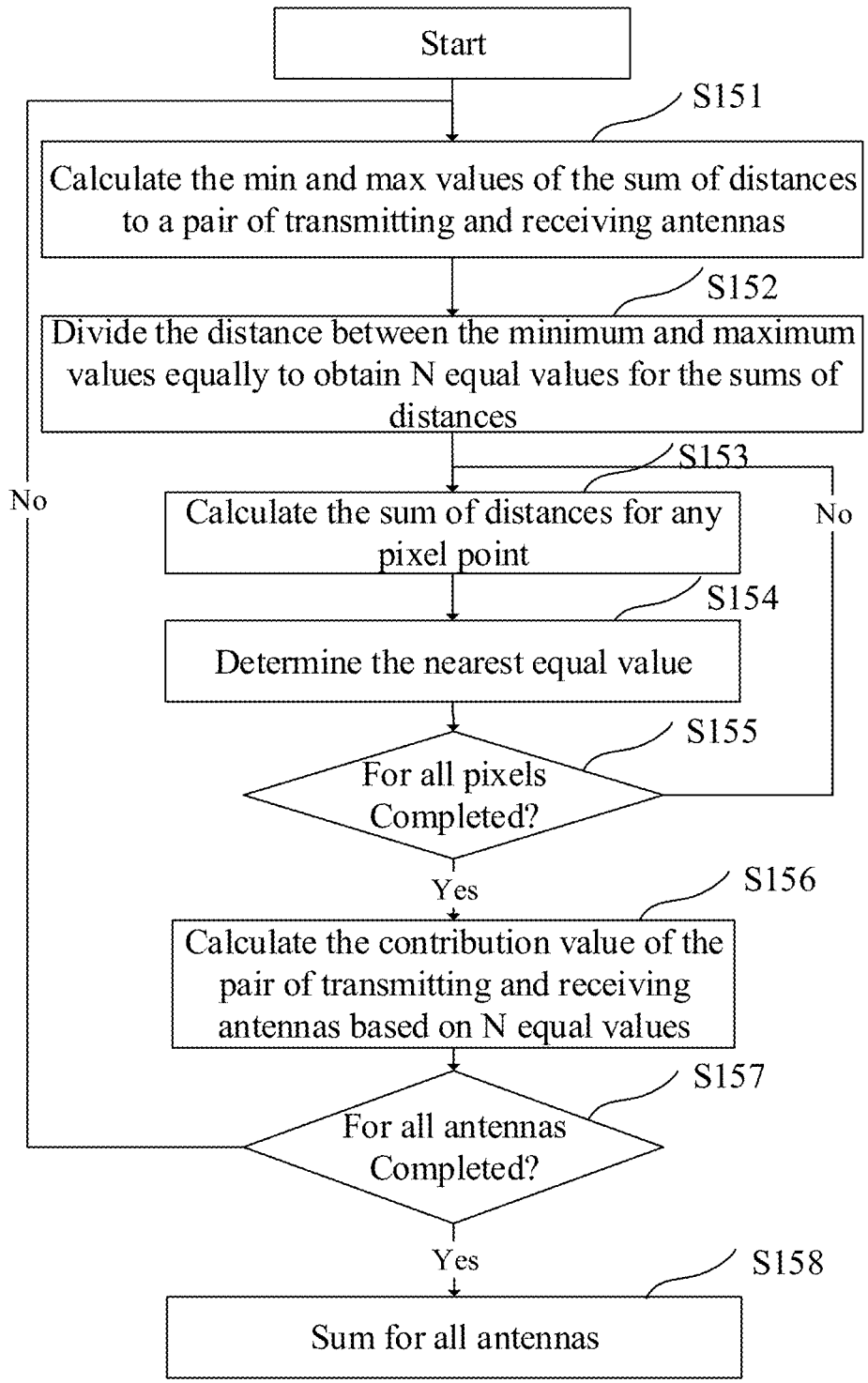
FIG. 8 is a flowchart illustrating one example of the fast backpropagation algorithm.

By further specifying the process of grouping pixel points, the fast backpropagation imaging algorithm may be shown in FIG. 8.

In step S151, the minimum value $r_{min}$ and maximum value $r_{max}$ of the sum $r_{T,R}$ of distances from each pixel point of all of the pixel points in the imaging area to the pair of the transmitting and receiving antennas are calculated. Generally, the minimum value $r_{min}$ is $r_{min} = \sqrt{(x_T-x_R)^2+(y_T-y_R)+z^2}$. The maximum value is the maximum value among the sums of distances from the pair of transmitting and receiving antennas to the vertices of the imaging area.

In step S152, as shown in FIG. 5, a distance rd between the minimum value $r_{min}$ and the maximum value $r_{max}$, is divided into equal intervals, so as to obtain N equipartition values $(r_1, r_2, \ldots, r_N)$ for the sums of distances. Wherein $dr=(r_{max}-r_{min})/N$, $r_1=r_{min}$, $r_2=r_1+dr$, $r_3=r_2+dr$, $\ldots r_N=r_{max}$. N is an integer greater than 1, and may be set arbitrarily according to the calculation accuracy and the size of the imaging area.

In step S153, the sum of distances from any one of the pixel points in the imaging area to the pair of transmitting and receiving antennas is calculated by using the above formula (3). Here, the processing at step S153 in FIG. 8 corresponds to the processing at step S51 in FIG. 7.

In step S154, the nearest equipartition values (e.g. $r_i$) to the sum of distances is determined from equipartition value $(r_1, r_2, \ldots, r_N)$. Here, the processing in steps S151 to S152 and S154 in FIG. 8 corresponds to the processing in step S54 in FIG. 7.

In step S155, it is determined whether the operation of step S153 is completed for all of the pixel points in the imaging area. If so, proceed to step S156; if not, return to step S153.

In step S156, the N equipartition values $(r_1, r_2, \ldots, r_N)$ are used as the sum $r_{T,R}$ of distances, and the contribution value of a pair of the transmitting and receiving antennas is calculated by the above-mentioned formula (4) based on the equipartition value and the holographic data $s(x_T, y_T, x_R, y_R, k)$ received by the pair of transmitting and receiving antennas. Here, the processing in step S156 in FIG. 8 corresponds to the processing in step S52 in FIG. 7.

In step S157, it is determined whether steps S151 to S156 are completed for all of the transmitting and receiving antennas. If so, proceed to step S158, if not, return to step S151, and perform calculation for the next pair of the transmitting and receiving antennas.

In step S158, the contribution values are summed by using the above formula (5), according to all pairs of the transmitting and receiving antennas, to obtain the complex reflectance. Here, the processing in step S158 in FIG. 8 corresponds to the processing in step S53 in FIG. 7.

By performing this operation, the pixel points with the same or adjacent sum of distances in the imaging area are assigned the same equipartition value. In other words, as shown in FIG. 6, by using the equipartition value $r_1$, $r_2, \ldots, r_N$, all of the pixel points in the imaging area are divided into N ellipsoidal surfaces, that is, N groups. It is enough to calculate the contribution value once for the pixel points located on an ellipsoid (for example, $r_i$).

As mentioned above, by dividing all of the pixel points in the imaging area into N groups, the equipartition values $r_1$, $r_2, \ldots, r_N$ are used as sums of distances for the pixel points of the N groups to obtain the contribution values, so as to calculate only N contribution values.

Therefore, compared to Embodiment 1, it is not necessary to sum all of the pixel points according to the sum of distances, greatly accelerating the reconstruction speed.

In FIG. 8, although the situation of executing steps S151 to S152 first and then S153 to S154 is shown, that is, determining the possible points where the minimum and maximum values of the sum of distances may appear, calculating the minimum and maximum values of the sum of distances, and then calculating the sum of distances for all of the pixel points and grouping them. However, it is not limited to this. It is also possible to first perform step S153 to calculate the sum of distances of all of the pixels in the imaging area, and then determine the minimum and maximum values of the sum of distances (i.e., perform step S151). Then, focus on steps S151 to S152 and S154 in FIG. 8, which are equivalent to step S54 in FIG. 7.

If the sum of distances of all of the pixel points is calculated and the minimum and maximum values are then selected from them, a large number of sums of distances need to be stored in a memory for a long time until the minimum and maximum values of all of the sums of distances are obtained and grouping is completed. However, in the case of using the process shown in FIG. 8, the calculation of the minimum and maximum values of the sum of distances is independent of the calculation of the sum of distances between each pixel point. It may be directly calculated based on geometric relationships, and the minimum and maximum values may be obtained with less computational effort. Moreover, whenever the sum of distances is calculated, the nearest equipartition value is determined, and this equipartition value is used in subsequent calculations. There is no need to save the sum of previously calculated distances for a long time, which may save storage space and computer resources.

(Second Implementation)

The structure of the second implementation differs from that of the first implementation in that the control device 20 further includes a key point determining module and an imaging area adjusting module. The key point determining module is configured for determining a core key point of the human body based on the 3D image information, and the imaging area adjusting module is configured for adjusting the imaging area based on the core key point. In other words, the 3D imaging method performed in the control device 20 is different from that of the first implementation.

A 3D imaging method according to the second implementation will be described with reference to FIG. 7. Steps S11 to S15 in FIG. 7 are the same as steps S1 to S15 in FIG. 4. The difference is that after step S13, there are steps S16 and S17.

In step S16, based on the deep learning model, the core key point of the human body in the image are determined for the 3D image information collected by the depth camera 11. Here, the core key point is the key point on the outline of the human body, such as the top of head, the neck, and the main joints of the limbs. The deep learning model used to determine the core key point is not particularly limited, and existing models may be used, for example, Deep Pose model, HeatMap model and CPM (convolutional pose machine) model.

In step S17, based on the core key points determined in step S16, human body parts related to each core key point in the imaging area are selected, thereby adjusting the imaging area determined in step S13.

As mentioned above, the core key point may represent the top of head, the neck, and the main joints of the limbs of the human body. The imaging area determined in step S13 is an area corresponding to the human body mask, that is, the imaging area at this point is an area containing the entire human body contour. And in step S17, a part of the imaging area containing the entire human body contour is retained, and the other part is removed, so that the imaging area only contains a part of the human body contour.

For example, according to the actual application scenario of the device, if it is considered that the head, neck and other items are difficult to hide and do not need to be the object of security inspection, these parts can be excluded from the imaging area according to the core key point. For example, the head of the human body is removed from the imaging area determined in step S13. Thus, the imaging area is adjusted to determine the final imaging area. However, in special regions such as Arab countries, where the head is covered with a turban, it is also possible to hide items. At this time, the head also needs to be used as an imaging area. In addition, the imaging of private parts of the human body is also subject to controversy, so this part can also be excluded from the imaging area.

The selection of human body parts related to each core key point may be pre-stored in the 3D imaging system, so as to automatically complete the adjustment of the imaging area, or it can be manually selected later as needed.

In the second implementation, by adjusting the imaging area according to the core key point of the human body, the imaging area may be made more reasonable, the image reconstruction range may be further reduced, and the calculation speed of image reconstruction may be further improved.

Modified Example

On the basis of the above-mentioned first implementation, the control device 20 further includes a key point determining module and a posture determining module. Regarding the key point determining module, reference may be made to the above-mentioned second implementation. On the basis of the above-mentioned second implementation, the control device 20 may further include a posture determining module.

The posture determining module is configured for determining whether a posture of the detected object is correct based on a position of the core key point, and triggering an alarm under a condition that the posture is not correct.

Figure 9:
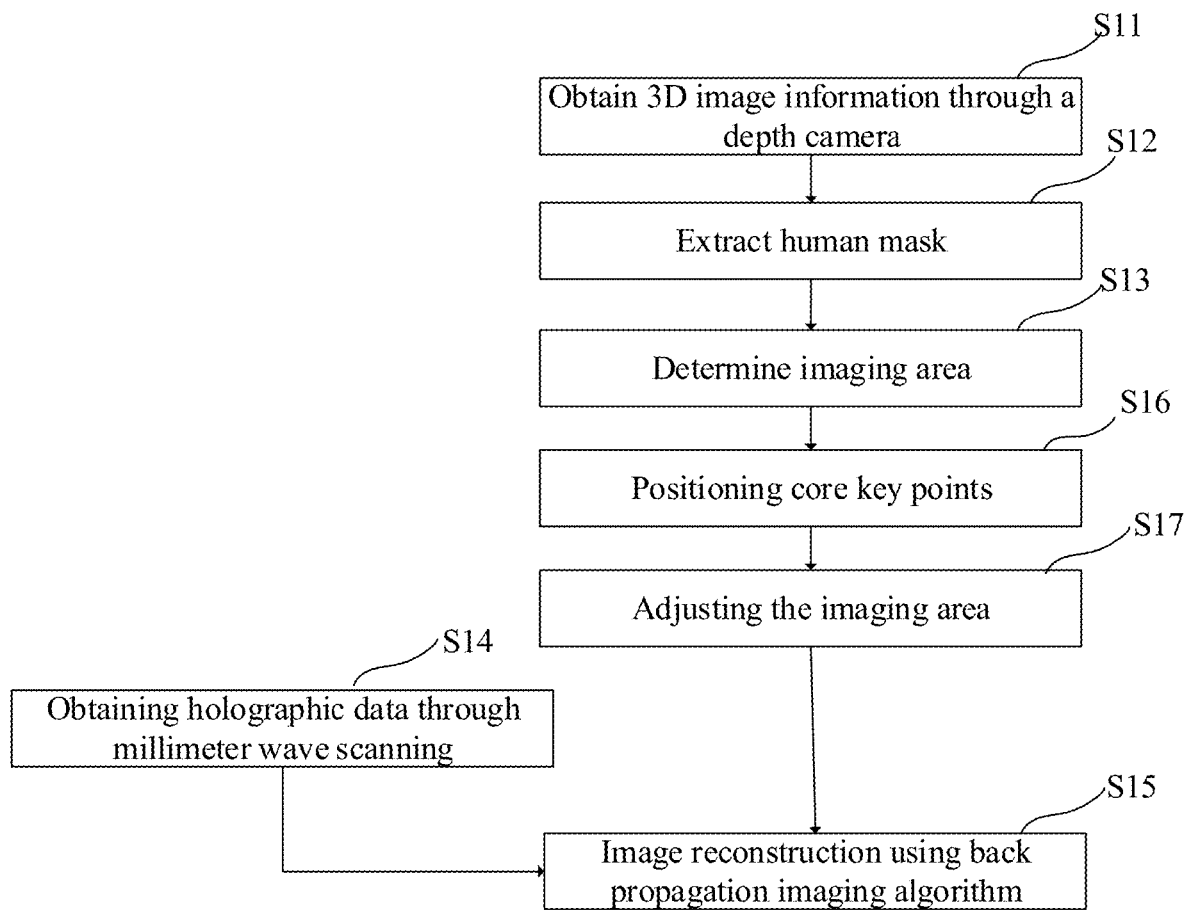
FIG. 9 is a flowchart illustrating a 3D imaging method according to a second implementation of the present application.

This posture determining process may be performed after step S13 in FIG. 4, or after step S17 in FIG. 9 and before step S15.

If the posture of the human body is not correct, it may not be possible to accurately find out the available items. By adding a posture determining module, the posture of the human body under security inspections may be corrected.

In addition, since such posture determining process is performed before the image reconstruction in step S15, it is possible to avoid generating an invalid security inspection image due to a wrong posture before the image is reconstructed, and it is possible to avoid waste of computing resources.

Moreover, in the present application, for example, if the control device 20 includes a plurality of processors, or includes a multi-core processor, when performing image reconstruction, each core of the multi-core GPU may independently perform image reconstruction for one pixel point. Specifically, in the example shown in FIG. 8, each core of the GPU may respectively calculate the sum of distances of a pixel point to determine the nearest equipartition value, that is, perform the above-mentioned steps S153-S154 respectively. In this case, thousands of pixels may be reconstructed at the same time, so that the calculation speed may be improved.

In addition, if the control device 20 includes an FPGA (Field Programmable Gate Array, Field Programmable Gate Array), a part of the processing performed by the above control device 20 may be implemented by the FPGA. For example, the holographic data collection device in the millimeter wave imaging device is controlled by the FPGA, so as to control the emission and data collection of the millimeter waves. Specifically, after collecting the holographic data of a pair of transmitting and receiving antennas, it may be preprocessed. The preprocessed holographic data is sent to other processors such as CPU for subsequent processing, and the FPGA controls the next pair of transmitting and receiving antennas to collect the holographic data. For example, the preprocessing may be: for the pair of the transmitting and receiving antennas, firstly calculating, by the FPGA, a contribution value of the pair of the transmitting and receiving to the pixel points. Thereafter, the calculated contribution value is sent to other processors such as CPU, and the CPU or the like performs subsequent image reconstruction operations. At this time, the FPGA controls the collection of the holographic data of the next pair of the transmitting and receiving antennas. As mentioned above, through the division and cooperation of processors such as FPGA and CPU, not only the workload of the CPU may be reduced, but also the image reconstruction time may be reduced.

Above, although the embodiments and specific examples of the present application have been described in conjunction with the accompanying drawings, those skilled in the art may make various modifications and variations without departing from the scope of the present application, which modifications and variations fall within the scope defined by the claims.

What is claimed is:

1. A three-dimensional (3D) imaging method, comprising:
   a 3D information obtaining step, for generating 3D image information by capturing a 3D capture area containing a detected object using a depth camera;
   a mask extracting step, for extracting a mask of the detected object from the 3D image information;
   an imaging area determining step, for determining an imaging area associated with the detected object based on the mask of the detected object, wherein the imaging area is an area corresponding to the mask;
   a holographic data obtaining step, for collecting data from a holographic data collection area containing the detected object by a holographic data collection device, to generate holographic data; and
   an image reconstructing step, for performing image reconstruction on the imaging area based on the holographic data.

2. The 3D imaging method of claim 1, wherein,
the mask extracting step comprises applying an image segmentation algorithm to the 3D image information to extract the mask of the detected object.

3. The 3D imaging method of claim 2, wherein
the image segmentation algorithm is a DeepLabV3+ segmentation algorithm based on a neural network.

4. The 3D imaging method of claim 1, wherein
a backpropagation imaging algorithm is applied in the image reconstructing step for the image reconstruction.

5. The 3D imaging method of claim 4, wherein,
the holographic data collection device comprises a multiple-input multiple-output (MIMO) antenna array, and the MIMO antenna array comprises a plurality of pairs of transmitting and receiving antennas for transmitting and receiving millimeter waves,
the backpropagation imaging algorithm comprises:
  calculating, for a pixel point in the imaging area, a sum of distances from the pixel point to each pair of the transmitting and receiving antennas;
  obtaining a complex reflectance of each pixel point in the imaging area by performing an operation of summing for all of the transmitting and receiving antennas, as well as transmission frequencies of the millimeter waves, based on the holographic data received by the receiving antenna and the sum of distances; and
  creating a reconstructed image based on the complex reflectance calculated for all of the pixel points in the imaging area.

6. The 3D imaging method of claim 5, wherein,
the backpropagation imaging algorithm comprises:
  calculating, by using formula (1), a sum of distances $r_{T,R}$ from a pixel point (x, y, z) in the imaging area to each pair of the transmitting and receiving antennas;

$$r_{T,R}=\sqrt{(x-x_T)^2+(y-y_T)^2+z^2}+\sqrt{(x-x_R)^2+(y-y_R)^2+z^2} \quad (1)$$

obtaining, by using formula (2), a complex reflectance $\hat{O}$ (x, y, z) of the pixel point (x, y, z) in the imaging area, based on the holographic data $s(x_T, y_T, x_R, t_R, k)$ received by the receiving antenna and the sum $r_{T,R}$ of distances:

$$\hat{O}(x, y, z) = \sum_{\forall y_r}\sum_{\forall x_r}\sum_{\forall y_t}\sum_{\forall x_t}\sum_{\forall k} s(x_T, y_T, x_R, y_R, k)\exp(jkr_{T,R}) \quad (2)$$

wherein ($x_R$, $y_R$, 0) are coordinates of the receiving antenna, ($x_T$, $y_T$, 0) are coordinates of the transmitting antenna, (x, y, z) are coordinates of the pixel points in the imaging area, k is wave number, and k=2π/2, wherein 2 is wavelength; and
  creating a reconstructed image based on the complex reflectance calculated for all of the pixel points in the imaging area.

7. The 3D imaging method of claim 4, wherein,
the holographic data collection device comprises a multiple-input multiple-output (MIMO) antenna array, and the MIMO antenna array comprises a plurality of pairs of transmitting and receiving antennas for transmitting and receiving millimeter waves,
the backpropagation imaging algorithm is a fast backpropagation imaging algorithm comprising:
  calculating, for each pair of the transmitting and receiving antennas, a contribution value of the pair of the transmitting and receiving antennas to each pixel point in the imaging area;
  obtaining, for all of the transmitting and receiving antennas, a complex reflectance of each pixel point in the imaging area by performing an operation of summing for all of the transmitting and receiving antennas, based on the contribution value; and
  creating a reconstructed image based on the complex reflectance.

8. The 3D imaging method of claim 7, wherein,
calculating, for each pair of the transmitting and receiving antennas, the contribution value of the pair of the transmitting and receiving antennas to each pixel point in the imaging area comprises:
  calculating, for the pair of the transmitting and receiving antennas, a sum of distances from each pixel point in the imaging area to the pair of the transmitting and receiving antennas;
  calculating the contribution value based on the sum of distances and the holographic data received by the receiving antenna.

9. The 3D imaging method of claim 8, wherein the fast backpropagation imaging algorithm comprises:
  calculating, by using formula (3), for each pair of a transmitting antenna T and a receiving antenna R, a sum $r_{T,R}$ of distances from a pixel point (x, y, z) in the imaging area to the pair of the transmitting and receiving antennas;

$$r_{T,R}=\sqrt{(x-x_T)^2+(y-y_T)^2+z^2}+\sqrt{(x-x_R)^2+(y-y_R)^2+z^2} \quad (3)$$

calculating, by using formula (4), a contribution value $P_{T,R}$ to the pixel point (x, y, z), based on the sum $r_{T,R}$ of distances and the holographic data $s(x_T, y_T, x_R, y_R, k)$;

$$P_{T,R}=\Sigma_{\forall k} s(x_T,y_T,x_R,y_R,k)\exp(jkr_{T,R}) \quad (4)$$

obtaining, by using formula (5), a complex reflectance $\hat{O}$ (x, y, z) of each pixel point in the imaging area, based on the contribution value $P_{T,R}$:

$$\hat{O}(x,y,z)=\Sigma_{\forall y_r}\Sigma_{\forall x_r}\Sigma_{\forall y_t}\Sigma_{\forall x_t} P_{T,R} \quad (5)$$

wherein, $r_{T,R}$ is the sum of distances from the pixel point (x, y, z) in the imaging area to each pair of the transmitting and receiving antennas, $s(x_T, y_T, x_R, y_R, k)$ is the holographic data obtained through the pair of the transmitting and receiving antennas, k is wave number, and k=2π/2, wherein λ is wavelength; and
  creating a reconstructed image based on the complex reflectance.

10. The 3D imaging method of claim 7, wherein,
calculating, for each pair of the transmitting and receiving antennas, the contribution value of the pair of the transmitting and receiving antennas to each pixel point in the imaging area comprises:
  classifying the pixel points in the imaging area that have the same sum of distances to the pair of the transmitting and receiving antennas into a group; and
  calculating the contribution value of the pair of transmitting and receiving antennas to any one of the pixel points in the group, as the contribution value of each pixel point in the group.

11. The 3D imaging method of claim 7, wherein,
calculating, for each pair of the transmitting and receiving antennas, the contribution value of the pair of the transmitting and receiving antennas to each pixel point in the imaging area comprises:

calculating a minimum value and a maximum value of the sum of distances from all of the pixel points in the imaging area to the pair of transmitting and receiving antennas;

dividing a distance between the minimum value and the maximum value into equal intervals, to obtain N equipartition values ($r_1, r_2, \ldots, r_N$) of the sum of N distances;

calculating the sum of distances from any one of the pixel points in the imaging area to the pair of transmitting and receiving antennas, determining the nearest equipartition value to the sum of distances, and taking the equipartition value as the sum of distances for the pixel point;

determining the nearest equipartition value for all of the pixel points in the imaging area; and calculating the contribution value by taking the equipartition value as the sum of the distances.

12. The 3D imaging method of claim 1, further comprising:

a key point determining step, for determining a core key point of the detected object based on a deep learning model; and an imaging area adjusting step, for selecting a portion of the detected object associated with the core key point in the imaging area based on the core key point, so as to adjust the imaging area.

13. The 3D imaging method of claim 1, further comprising:

a key point determining step, for determining a core key point of the detected object based on a deep learning model, and a detected object posture determining step, for determining whether a posture of the detected object is correct based on a position of the core key point, and triggering an alarm under a condition that the posture is not correct.

14. A 3D imaging system, comprising a depth camera, a holographic data collection device, and a control device, wherein the control device comprises:

a 3D information obtaining module, for controlling the depth camera to capture a 3D capture area containing a detected object to obtain 3D image information;

a mask extracting module, for extracting a mask of the detected object from the 3D image information;

an imaging area determining module, for determining an imaging area associated with the detected object based on the mask of the detected object, wherein the imaging area is an area corresponding to the mask;

a holographic data obtaining module, for controlling the holographic data collection device to collect data from a holographic data collection area containing the detected object so as to obtain holographic data; and an image reconstructing module, for performing image reconstruction on the imaging area based on the holographic data.

15. The 3D imaging system of claim 14, wherein, the holographic data collection device comprises a multiple-input multiple-output (MIMO) antenna array, and the MIMO antenna array comprises a plurality of pairs of transmitting and receiving antennas for transmitting and receiving millimeter waves.

16. A 3D imaging device, comprising a memory, a processor, and program instructions stored in the memory and executable by the processor, wherein the processor, when executing the program instructions, implement:

a 3D information obtaining step, for obtaining 3D image information by capturing a 3D capture area containing a detected object using a depth camera;

a mask extracting step, for extracting a mask of the detected object from the 3D image information;

an imaging area determining step, for determining an imaging area associated with the detected object based on the mask of the detected object, wherein the imaging area is an area corresponding to the mask;

a holographic data obtaining step, for obtaining holographic data collected from a holographic data collection area containing the detected object by a holographic data collection device; and an image reconstructing step, for performing image reconstruction on the imaging area based on the holographic data.

* * * * *